US012022233B2

(12) United States Patent
Dauber et al.

(10) Patent No.: US 12,022,233 B2
(45) Date of Patent: Jun. 25, 2024

(54) WEB CONFERENCE CONTACT ROUTING

(71) Applicant: INTERNATIONAL BUSINESS MACHINES CORPORATION, Armonk, NY (US)

(72) Inventors: Melanie Dauber, Oceanside, NY (US); Zachary A. Silverstein, Georgetown, TX (US); Jacob Ryan Jepperson, St. Paul, MN (US); Jeremy R. Fox, Georgetown, TX (US); Spencer Thomas Reynolds, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 17/821,647

(22) Filed: Aug. 23, 2022

(65) Prior Publication Data

US 2024/0073365 A1 Feb. 29, 2024

(51) Int. Cl.
*H04N 7/15* (2006.01)
*H04L 12/18* (2006.01)

(52) U.S. Cl.
CPC ......... *H04N 7/152* (2013.01); *H04L 12/1818* (2013.01)

(58) Field of Classification Search
CPC ........................... H04N 7/152; H04L 12/1818
USPC ...................................................... 348/14.09
See application file for complete search history.

(56) References Cited

U.S. PATENT DOCUMENTS

| 8,994,671 | B2 | 3/2015 | Reeves |
| 11,146,601 | B1 | 10/2021 | Silverstein |
| 2008/0016155 | A1* | 1/2008 | Khalatian ............... G06F 3/038 709/204 |
| 2010/0257450 | A1* | 10/2010 | Go ........................ G06F 3/1454 715/788 |

(Continued)

FOREIGN PATENT DOCUMENTS

| JP | 2017511558 A | 4/2017 |
| TW | 611345 B | 1/2018 |

OTHER PUBLICATIONS

"Live Event Streaming Solution", Watson Media, IBM, Downloaded from the Internet on May 27, 2022, 10 pgs., <https://www.ibm.com/watson/media/live-event-streaming-services>.

(Continued)

*Primary Examiner* — Binh Kien Tieu
(74) *Attorney, Agent, or Firm* — James L. Olsen (57) ABSTRACT

Aspects of the present disclosure relate to web conference contact routing. An indication of a first participant device of a web conference attempting to contact a second participant device of the web conference can be received, where the second participant device is designated as a screen sharer within the web conference during a time of the contact and where the contact is configured to be received on a display shared in the web conference. Two or more candidate devices for routing the contact from the first participant device to can be identified. A candidate device of the two or more candidate devices for routing the contact from the first participant device to can be selected using a set of selection criteria. Contact from the first participant device can be routed to the selected candidate device instead of the display of the second participant device shared in the web conference.

20 Claims, 3 Drawing Sheets

(56) References Cited

U.S. PATENT DOCUMENTS

| | | | |
|---|---|---|---|
| 2013/0018960 A1* | 1/2013 | Knysz | G06Q 50/01 709/204 |
| 2015/0149929 A1 | 5/2015 | Shepherd | |
| 2015/0244814 A1* | 8/2015 | Khalatian | H04L 67/141 715/753 |
| 2019/0081993 A1* | 3/2019 | Shim | H04L 12/1822 |
| 2019/0098110 A1* | 3/2019 | Yoon | H04L 67/303 |
| 2019/0163927 A1 | 5/2019 | Kochura | |
| 2020/0019716 A1* | 1/2020 | Leonard | H04L 63/105 |
| 2020/0117415 A1* | 4/2020 | Lindblom | H04N 21/44008 |
| 2020/0259931 A1* | 8/2020 | Ding | H04L 65/1101 |
| 2021/0089256 A1 | 3/2021 | Lieb | |
| 2022/0103639 A1* | 3/2022 | Ogasawara | H04L 12/1827 |
| 2022/0272134 A1* | 8/2022 | Jain | H04L 65/4015 |
| 2022/0286309 A1* | 9/2022 | Kamekura | H04L 67/55 |
| 2022/0334790 A1* | 10/2022 | Lawrence | G06F 3/1454 |
| 2023/0214958 A1* | 7/2023 | Zhang | G06T 3/40 345/671 |
| 2023/0367534 A1* | 11/2023 | Cui | G06F 3/1454 |
| 2023/0403266 A1* | 12/2023 | Cui | G06F 9/452 |

OTHER PUBLICATIONS

"Video Conferencing Market Size, Share & Covid-19 Impact Analysis, by Component (Solution and Services), by Conference Type (Telepresence System, Integrated System, Desktop System and Service-based system), by Deployment (Cloud, On-premises), by Enterprises Size (Small and Medium Enterprises (SMEs), Large Enterprises), by Application (Small Rooms, Huddle Rooms, Middle Rooms, and Large Rooms) and Regional Forecast, 2022-2029", Fortune Business Insights, Downloaded from the internet on May 27, 2022, 8 pgs.

"Webex App | Start a Conversation with Someone", Webex Help Center, Nov. 3, 2021, 3 pgs., <https://help.webex.com/en-us/article/zi4dpc/Webex-App-%7C-Start-a-Conversation-with-Someone>.

The Express Wire, "Messaging Platform Market in 2022 : 8.1% CAGR with Top Countries Data, What is the Messaging Platform Industry growth? | On New Data Insights With 94 Pages Report", Digital Journal, Mar. 10, 2022, 18 pgs.

\* cited by examiner

WEB CONFERENCE CONTACT ROUTING

BACKGROUND

The present disclosure relates generally to the field of computing, and in particular, to web conference contact routing.

Web conferencing software facilitates communication between individuals online via transmission of audio/video (A/V) data of the individuals in real-time over a network.

SUMMARY

Embodiments of the present disclosure are directed to a method, system, and computer program product for web conference contact routing.

An indication of a first participant device of a web conference attempting to contact a second participant device of the web conference can be received, where the second participant device is designated as a screen sharer within the web conference during a time of the contact and where the contact is configured to be received on a display shared in the web conference. Two or more candidate devices for routing the contact from the first participant device to can be identified. A candidate device of the two or more candidate devices for routing the contact from the first participant device to can be selected using a set of selection criteria. Contact from the first participant device can be routed to the selected candidate device instead of the display of the second participant device shared in the web conference.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and in particular, to web conference contact routing. While the present disclosure is not necessarily limited to such applications, various aspects of the disclosure can be appreciated through a discussion of various examples using this context.

Web conferencing software facilitates communication between individuals online via transmission of audio/video (A/V) data of the individuals in real-time over a network. Web conferencing offers real-time point-to-point communications from one sender to many receivers. Web conference services allow text, audio, and/or video data to be shared simultaneously across geographically dispersed locations. Though web conferences have increased the ability for individuals to communicate in real-time, there are still improvements that need to be made.

In web conferences, there can be an option to designate a "presenter" or designate a user for "screen-sharing." This allows the designated user to share content that is displayed on one of their monitors, applications, windows, etc. of their device to other participants within the web conference. In these instances, if other attendees within the web conference need to privately contact (e.g., direct message) the presenter or screen sharer, there is a risk the contact will be shared to other participants within the web conference. For example, if a presenter is currently sharing their monitor (e.g., display or screen) and a direct message is received from a participant within a messaging application opened on their shared monitor, the message could be revealed through the web conference to other participants. Though methods exist for messaging a presenter or screen sharer in a private manner, these methods are often overlooked, underutilized, or impractical.

For example, users can designate specific content for sharing, such as a specific application or window, rather than their display/monitor. However, in these instances, the sharer is limited to sharing only what is included in the application or window they selected for sharing. Should the need arise to share content outside of the specific application or window designated for sharing, the presenter may be required to revert to display/monitor/screen-based sharing, which reintroduces privacy concerns. Further, though participants may be aware of external contact methods (e.g., other nearby devices) for contacting the designated screen sharer during the web conference, they may not be currently aware of which devices are currently being utilized by the designated screen sharer, which devices are nearby the designated screen sharer, which devices are most suitable for routing the contact to, etc.

Contacting the designated screen sharer may be necessary for a variety of reasons. For example, a participant may be attempting to contact the designated screen sharer to attempt to improve the quality of their screen sharing session (e.g., to provide suggestions on the presentation), to request to modify the content being shared (e.g., to update data shared within a client meeting), to provide feedback on the screen sharing session, etc. Automatic routing of contact to an appropriate device, such that the screen sharer can readily see the message/notification without privacy concerns, improves web conference technology by enhancing the screen sharer's ability to receive and respond to real-time feedback received from other participants within the web conference in a private manner.

Aspects of the present disclosure relate to web conference contact routing. An indication of a first participant device of a web conference attempting to contact a second participant device of the web conference can be received, where the second participant device is designated as a screen sharer within the web conference during a time of the contact and where the contact is configured to be received on a display shared in the web conference. Two or more candidate devices (e.g., not included within the web conference) for routing the contact from the first participant device to can be identified. A device of the two or more candidate devices for routing the contact from the first participant device to can be selected using a set of selection criteria (e.g., proximity requirements, usage requirements, user preference requirements, contact method requirements, etc.). Contact from the first participant device can be routed to the selected candidate device instead of the display of the second participant device shared in the web conference.

Aspects of the present disclosure provide various improvements over existing web conference solutions for preventing unwanted revealing of messages to participants of web conferences via screen sharing. By routing contact to another device associated with the screen sharing user, the contact can be prevented from being displayed on the shared screen, thus removing potential privacy concerns associated with contact received from other participants on the web conference. Further, by selecting the candidate device for routing the contact to based on selection criteria such as proximity requirements, usage requirements, user preference requirements, contact method requirements, etc. there is a higher likelihood that the screen sharer will actually receive and act on the contact received during the web conference. For example, if the contact indicates an improvement, correction, suggestion, or other useful information from a participant related to the active screen sharing session, the screen sharing user may be able to address the issue without other participants on the web conference knowing (e.g., seeing the contact).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
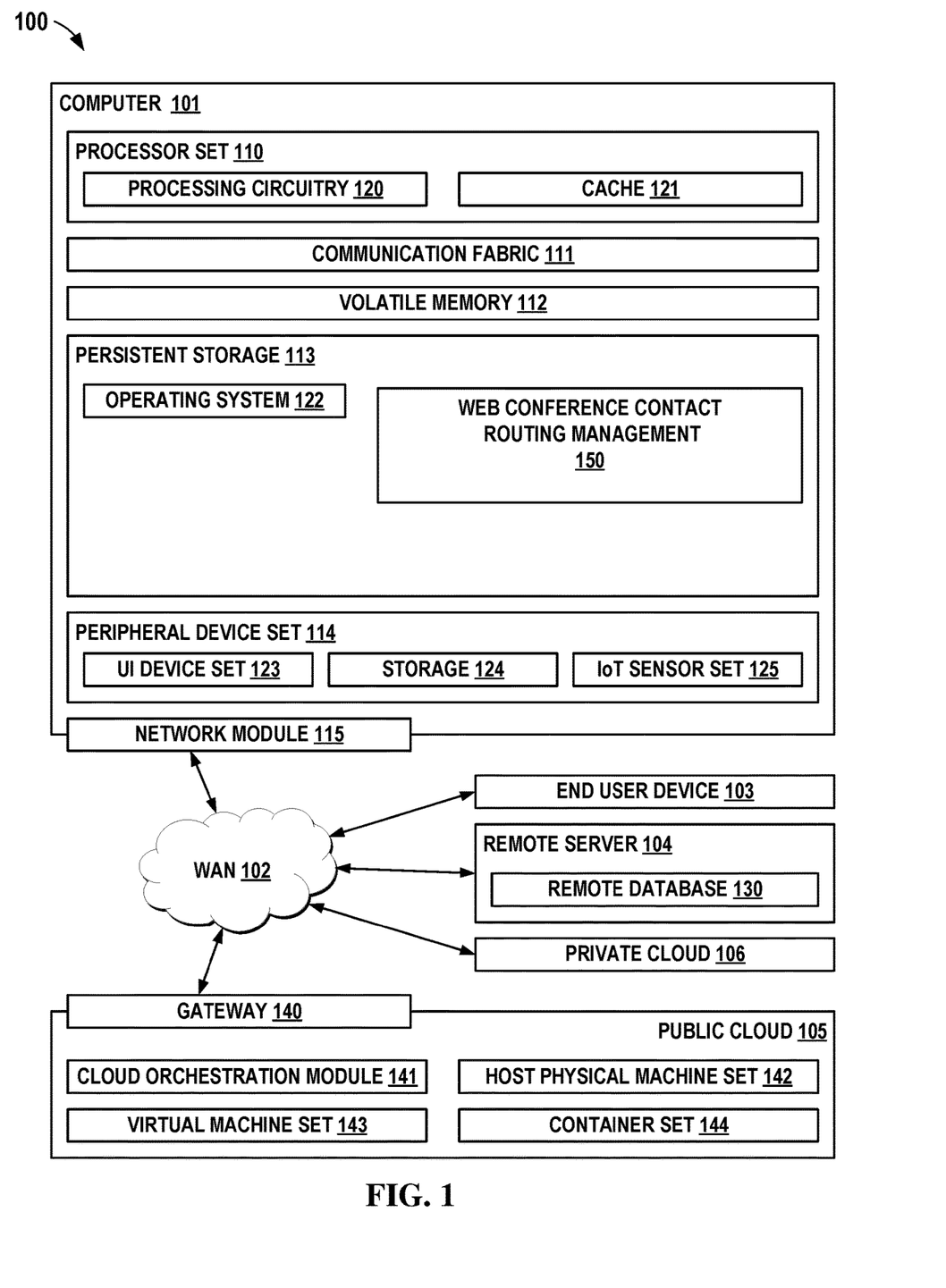
FIG. 1 is a high-level block diagram illustrating an example computer system and network environment that can be used in implementing one or more of the methods, tools, modules, and any related functions described herein, in accordance with embodiments of the present disclosure.

Computing environment 100 contains an example of an environment for the execution of at least some of the computer code involved in performing the inventive methods, such as web conference contact routing management 150. In addition, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some or all of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 includes the signal conduction paths that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, mixed reality (MR) headset, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
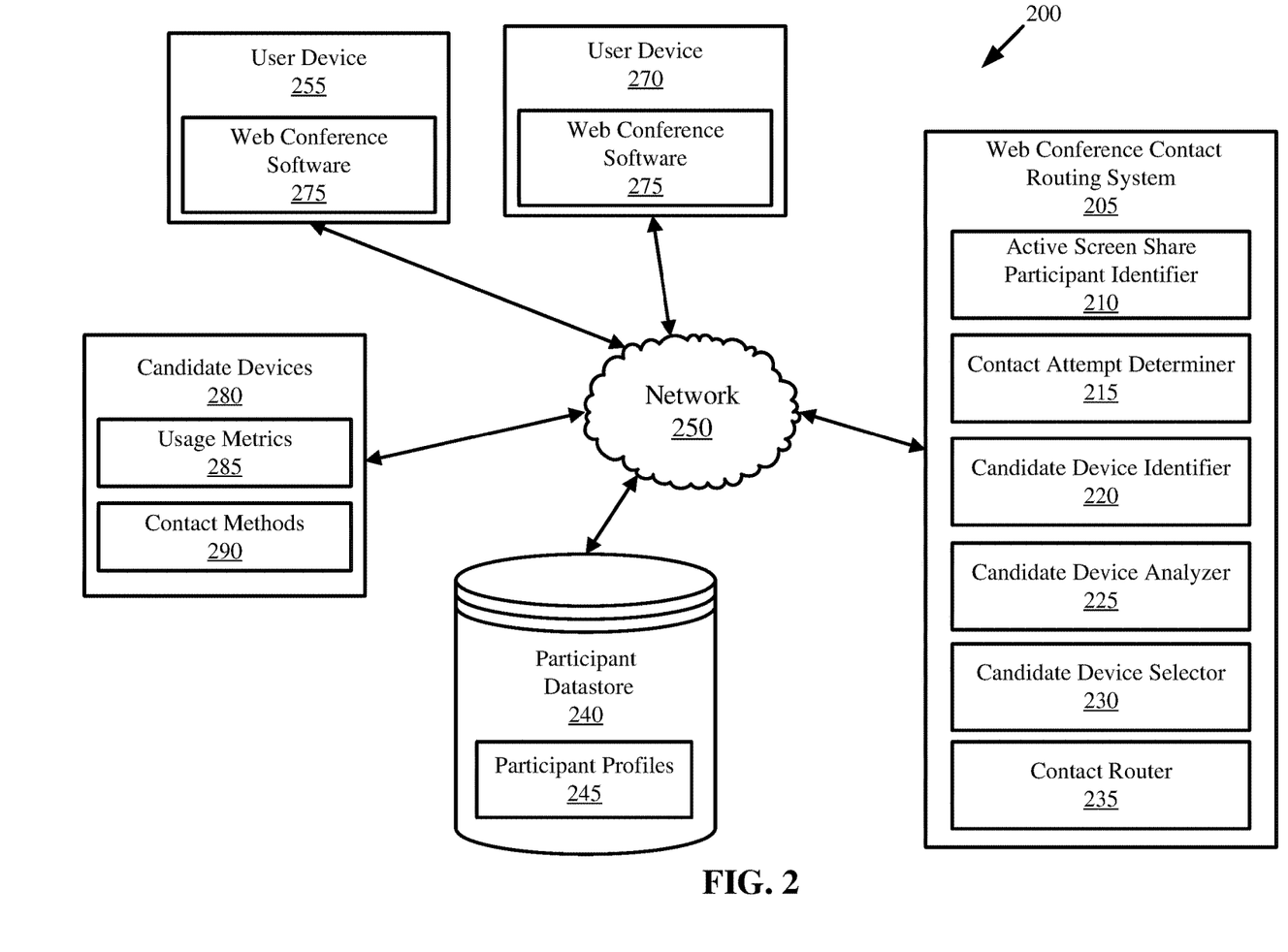
FIG. 2 is a block diagram illustrating an example computing environment in which illustrative embodiments of the present disclosure can be implemented.

Turning now to FIG. 2, shown is a block diagram illustrating an example computing environment 200 in which illustrative embodiments of the present disclosure can be implemented. Computing environment 200 includes a web conference contact routing system 205, a user device 255, a user device 270, candidate devices 280, and a participant datastore 240. The web conference contact routing system 205, user devices 255, 270, candidate devices 280, and participant datastore 240 can be distant from each other and communicate over a network 250. The network 250 can be the same as, or substantially similar to, WAN 102 described with respect to FIG. 1. In embodiments, network 250 can be a local area network (LAN) or any other suitable network topology (e.g., peer-to-peer).

The web conference contact routing system 205 can be configured to analyze contact (e.g., emails, text messages, instant messaging application messages, notifications, or other visually displayed contact methods) transmitted from and/or received by participants within web-based conferences and route (e.g., "reroute") the contact to candidate devices 280 to prevent the sharing of private/sensitive contact. In particular, the web-conference contact routing system 205 can be configured to receive an indication of a user attempting to contact a user device designated as a screen sharer within a web conference and reroute the contact to a candidate device 280 of the user to prevent the contact from being shared across all participants attending the web conference.

The web conference contact routing system 205 includes an active screen share participant identifier 210, a contact attempt determiner 215, a candidate device identifier 220, a candidate device analyzer 225, a candidate device selector 230, and a contact router 235. The functionalities of the active screen share participant identifier 210, contact attempt determiner 215, candidate device identifier 220, candidate device analyzer 225, candidate device selector 230, and contact router 235 can be processor-executable instructions that can be executed by a dedicated or shared processor using received inputs.

The user devices 255, 270 and candidate devices 280 can each be the same as, or substantially similar to, computer 101 described with respect to FIG. 1. That is, the user devices 255, 270 and candidate devices 280 can include one or more processors and/or memories and can be configured to communicate with other components over network 250. The user devices 255 and 270 each include web conference software 275. The web conference software 275 can be application based, browser based, operating system (OS) based, etc. Web conference software 275 can allow devices 255 and 270 to transfer textual, audio, and/or video data in real-time over network 250. The web conference software 275 can be provided as a service from a server (e.g., web conference contact routing system 205 or a web conference server (not shown)).

The candidate devices 280 can be devices which are not running web conference software 275 but may be routed contact (e.g., transferred contact, redirected contact, etc.) received by user devices 255 and 270 during a live web conference. The routing of contact from user devices 255 and/or 270 to candidate devices 280 can be completed by the web conference contact routing system 205 based on proximity, usage metrics 285, and contact methods 290 associated with the candidate devices 280. The usage metrics 285 indicate usage time/actions (e.g., viewing time and interactions such as clicks, scrolling, etc.) associated with each candidate device. The usage metrics 285 can be used to select a candidate device for rerouting contact from user devices 255 and 270 within web conference software 275, to be discussed further below. The contact methods 290 indicate installed/configured communication methods on each candidate device 280. For example, contact methods 290 can include social media applications/platforms, instant messaging applications, cellular network communication methods, email platforms, forum/blogging applications, and the like.

The active screen share participant identifier 210 can be configured to analyze a live web conference to determine whether any participants are currently screen sharing (e.g., whether any participant devices are designated as a "screen-sharer"). Screen sharing is a common option within web conferences which enables users to share content that is currently displayed on their device to other participants within web conferences. Screen sharing can be completed for specific displays/monitors/screens (e.g., if a user has multiple displays connected to a single device), applications, windows, and/or files displayed on a device.

In embodiments, the active screen share participant identifier 210 can be configured to determine whether a participant device is an active screen sharer based on an option being selected or a function being executed which results in the user's content being shared within the web conference software 275. For example, if a user of user device 255 selects a screen share option or begins to execute screen share functionality within web conference software 275, then a determination can be made that the user of the user device 255 is an active screen sharer. Indications of a user selecting a screen sharing option or executing screen sharing functionality can be received via an application programming interface (API). In embodiments, a determination can be made that a user device is a screen sharer only if a monitor-based screen share option is selected (e.g., not for a window, file, or application based screen share which could prevent outside contact from being revealed to the participants in the web conference). However, in some embodiments, even application, window, and/or file-based screen sharing can lead to a determination that a participant device is designated as a screen sharer. For example, messages shared within applications, windows, and/or files can also be unintentionally shared within a web conference via screen sharing.

The contact attempt determiner 215 can be configured to determine whether a participant device (e.g., a first participant device) of a web conference attempts to contact a participant device determined to be a designated screen sharer (e.g., a second participant device) within the web conference. In embodiments, communication received by the designated screen share device can be monitored to determine whether any contact is received on their shared content/display. In these embodiments, upon receipt of contact by the designated screen share device, the contact can be dynamically rerouted (e.g., by modules 220-235) to prevent revealing any received contact (e.g., within a short time period such that the contact cannot be read/displayed). In some embodiments, contact transmitted by other participant devices of the web conference can be monitored (e.g., prior to receipt by the screen share device) by the contact attempt determiner 215 such that the contact can be rerouted prior to receipt by the designated screen share device. Thus, contact can be analyzed/rerouted either before receipt by the screen share device or upon receipt by the screen share device. However, any suitable manner for monitoring contact transmitted to or received by a designated screen share device can be implemented.

In embodiments, the contact attempt determiner 215 can be configured to analyze the context of the contact transmitted to and/or received by the designated screen share device to determine whether the contact is intended to be private/confidential. For example, the contact attempt determiner 215 can analyze contact transmitted to or received by a designated screen share device using optical character recognition (OCR) and/or natural language processing (NLP) techniques to determine whether the content is classified as "private" or "confidential." In these embodiments, if contact is classified as private or confidential based on an NLP analysis, the content can be rerouted to prevent the contact from being displayed on the shared display. In these embodiments, content that is not classified as private or confidential can be allowed to be displayed on the shared display of the device, where content that is classified as private or confidential can be rerouted to a candidate device 280 to prevent potential sharing.

Various NLP algorithms can be used to analyze contact transmitted to or received by an active screen share device for determining whether or not the contact is sensitive/private. These include, among others, morphological analysis (e.g., lemmatization, segmentation, part-of-speech tagging, stemming, etc.), syntactic analysis (e.g., parsing, sentence breaking, etc.), semantic analysis (e.g., named entity recognition (NER), terminology extraction, sentiment analysis, entity linking, etc.), and text classification. In embodiments, a list of keywords can be used to determine whether the contact is sensitive/private. For example, if any keywords or key phrases relating to privacy are detected (e.g., "classified," "confidential," "do not share," etc.), then a determination can be made that the contact is classified as private/confidential.

In some embodiments, the contact attempt determiner 215 can be configured to analyze actions performed by the designated screen share device to determine whether any contact received is intended to be private. For example, if a user of the designated screen share device attempts to quickly close or hide received contact (e.g., by minimizing or closing a contact application window) upon receiving a message (e.g., based on real-time action capturing/analysis), a determination can be made that the received message is intended to be private or confidential and thus rerouting by modules 220-235 can be completed.

The candidate device identifier 220 can be configured to identify candidate devices 280 for rerouting contact to from the active screen share device. In some embodiments, candidate devices 280 can be identified based on devices sharing a wireless network (e.g., network 250) with the active screen share device (e.g., device 255 or 270). A list of devices sharing a wireless network with the active screen share device can be discovered by analyzing the wireless network, for example, using a wireless network management application (not shown). In some embodiments, candidate devices 280 can be determined using IoT sensors (e.g., cameras) within an environment of the active screen share device. In some embodiments, candidate devices 280 can be identified based on a user-defined list of devices (e.g., within participant profiles 245). However, the candidate devices 280 can be identified in any other suitable manner.

In embodiments, candidate devices 280 for contact rerouting can be stored within the participant profiles 245 of a participant datastore 240. Each participant of a web conference can have a participant profile 245 which indicates their candidate devices 280 for rerouting contact received during web conferences. For example, a first user of device 255 can have an associated list of candidate devices 280 to select from within participant profiles 245. As another example, a second user of device 270 can have a second associated list of candidate devices 280 to select from within participant profiles 245. As discussed above, candidate devices 280 can be any suitable transceiver device capable of receiving communication, such as computer system 101.

The participant profiles 245 can include usage metrics (e.g., usage metrics 285) of each candidate device (e.g., how often each device is used/viewed within a given time window), contact methods available to each candidate device (e.g., messaging applications and/or manners for receiving externally routed contact), usage metrics (e.g., usage metrics 285) for respective contact methods (e.g., how often each contact application is used within a given time window), identities of each candidate device, current locations of each candidate device (e.g., whether each device is currently nearby), and user-preferences for each candidate device (e.g., a user defined rankings for devices they prefer contact routed to). Each of the above metrics/characteristics of candidate devices 280 can be determined by candidate device analyzer 225. The above candidate device metrics/characteristics can be determined dynamically (e.g., upon determining that contact routing is required) or historically (e.g., candidate device data can be updated over time).

Candidate device data stored in participant profiles 245 can be populated over time. User opt-in for monitoring candidate device metrics and characteristics can be completed such that candidate device data can be collected/analyzed by candidate device analyzer 225. For example, upon user opt-in, usage metrics associated with each candidate device can be attained, contact methods available on each device can be determined, usage metrics associated with each contact method can be determined, identities of each device can be defined, locations of each device can be determined, and/or user preference rankings of each device can be defined. Each of the above metrics/characteristics can be used when selecting a candidate device 280 for contact rerouting. An example participant profile storing various metrics and characteristics of multiple devices of a user is shown in Table 1.

number of the above device metrics/characteristics can be used without departing from the spirit and scope of the present disclosure. Further the particular usage metrics can also vary. For example, usage metrics for devices and contact platforms can be based on any suitable time window (e.g., the last hour, day, week, month, etc.) of usage.

The candidate device analyzer 225 can collect, analyze, determine, and/or define the above device usage metrics/characteristics in any suitable manner. Candidate device identities/names can be received as defined by a user. Usage metrics over any given time window can be determined using device monitoring software (e.g., application or operating system based monitoring software, such as a background "Screen Time" monitoring program). Installed/available contact methods (e.g., social media applications, instant messaging applications, cellular data-based messaging, etc.) can be determined by analyzing applications/cellular networks installed on or configured on each device. Contact method usage metrics can be determined by analyzing message volume and application execution duration (e.g., via a monitoring software). Locations of devices can be determined using indoor positioning system (IPS) technology (e.g., based received signal strength indicators (RSSI), angle of arrival, time of flight, etc.) or global positioning system (GPS) technology, among other methods. User rankings can be received as defined by a user.

The candidate device selector 230 can be configured to select a device for rerouting the contact transmitted to or received by the active screen share device using (e.g., based on) selection criteria (e.g., one or more selection criterion). The selection criteria used by the candidate device selector 230 can vary, and can be dependent on any of the usage metrics/characteristics of candidate devices described above. For example, in embodiments, selection criteria can depend on location. In these embodiments, any device which is currently not nearby (e.g., device 3 in Table 1) can be

TABLE 1

Example Participant Profile

| Participant Profile | Device 1 | Device 2 | Device 3 | Device 4 |
|---|---|---|---|---|
| Name | Personal Phone | Gaming Laptop | Family Tablet | Business Phone |
| Usage Metrics | 4 hours/day | 0.5 hours/day | 2 hours/day | 6 hours/day |
| Contact Methods | App 1, App 2, App 3, Cellular Data Enabled | App 2, App 4 | App 3 | App 1, Cellular Data Enabled |
| Contact Method Usage | App 1 (2 hours, 262 messages) App 2 (1 hour, 53 messages) App 3 (20 minutes, 12 messages) Cellular Data (1073 messages) | App 2 (5 hours, 221 messages) App 4 (1 hour, 27 messages) | App 3 (2 hours, 103 messages) | App 1 (20 hours, 3503 messages) Cellular Data (434 messages) |
| Current Location | Nearby | Nearby | Not Nearby | Nearby |
| User Ranking | 1 | 3 | 4 | 2 |

As shown in Table 1, each device has an associated name, usage metrics, available contact methods, contact method usage, a current location, and a user ranking. The above example participant profile illustrates various selection factors that can be analyzed by candidate device analyzer 225 and considered for selection of a candidate device for rerouting contact to by candidate device selector 230. The above metrics/characteristics of respective candidate devices are merely exemplary and any suitable type and/or excluded from selection by candidate device selector 230. In some embodiments, selection criteria can depend on usage metrics. For example, a first ranked device based on usage metrics (e.g., device 4 in Table 1) can be automatically selected based on the highest usage metrics. In some embodiments, selection criteria can depend on available contact methods. For example, the selection criteria may require contact through a specific contact method (e.g., a text message transmitted through a cellular network versus an instant message transmitted through an instant messaging application versus an email transmitted through an email client). In these embodiments, selection criteria can specify that the selected device must have a particular available contact method. In some embodiments, selection criteria can depend on contact method usage. For example, selection criteria can specify that a certain amount of usage of a specific contact method is required for selection as a device for rerouting. However, any suitable number, type, and/or combination of selection criteria can be implemented without departing from the spirit and scope of the present disclosure. Table 2 shows example selection criteria that can be implemented for selecting a candidate device.

TABLE 2

Example Selection Criteria

| Selection Criteria | Criteria 1 | Criteria 2 | Criteria 3 | Criteria 4 |
|---|---|---|---|---|
| Proximity Requirement | Yes (10 feet) | Yes (50 feet) | Yes (Detection Range) | No (Any Distance) |
| Usage Metrics Requirement | At least 5 Minutes of Activity in Last Hour | Any Activity in the Last Day | At Least Two Hours of Activity in Last Week | None |
| Contact Method Requirement | Cellular Network or App 1 | Apps 1-3 | Cellular Network or Apps 1-3 | App 1 |
| Contact Method Usage Requirement | At least Five Messages in Last Day | At Least 10 Messages in Last Day | At least 1 Message in Last Hour | None |
| User Rank Requirement | Within Top 5 | No Rank Requirement | No Rank Requirement | No Rank Requirement |

As shown in Table 2, four selection criteria sets are illustrated. The first selection criteria set, "Criteria 1," indicates that there is a proximity requirement (the candidate device has to be within 10 feet of the screen sharing device), a usage metrics requirement (e.g., there must be at least five minutes of activity on the candidate device in the last hour), a contact method requirement (e.g., a cellular network or application 1 must be configured/installed on the candidate device), a contact method usage requirement (e.g., at least five messages must have been sent/received through the required contact method(s) in the last day on the candidate device), and a ranking requirement (e.g., the candidate device must be within top five rankings of a user defined ranking system).

The second criteria set, "Criteria 2" indicates that there is a proximity requirement (the candidate device has to be within 50 feet of the screen sharing device), a usage metrics requirement (e.g., there must be activity on the candidate device in the last day), a contact method requirement (e.g., applications 1, 2, or 3 must be configured/installed on the candidate device), a contact method usage requirement (e.g., at least ten messages must have been sent through the required contact method(s) in the last day on the candidate device), and that there is no ranking requirement.

The third criteria set, "Criteria 3" indicates that there is a proximity requirement (the candidate device must be within positioning detection range of the screen sharing device), a usage metrics requirement (e.g., there must be two hours of activity on the candidate device in the last week), a contact method requirement (e.g., a cellular network or applications 1, 2, or 3 must be configured/installed on the candidate device), a contact method usage requirement (e.g., at least one message must have been sent/received through the required contact method(s) in the last hour on the candidate device), and that there is no ranking requirement.

The fourth criteria set, "Criteria 4" indicates that there is no proximity requirement, that there is no usage metrics requirement, that there is a contact method requirement (e.g., application 1 must be configured/installed on the candidate device), that there is no contact method usage requirement, and that there is no ranking requirement.

Thus, in order to be selected as a device for routing contact to (e.g., from the participant device contacting the active screen share device) during screen sharing in a web conference, the device must meet the requirements set forth in the specific set of enforced selection criteria. For example, if the selection criteria of "Criteria 1" are enforced, then in order to be selected as a device for rerouting contact, the device must meet all of the requirements set forth in "Criteria 1" of Table 2. The above selection criteria sets are merely exemplary and any suitable number, type, combination and/or magnitude of selection criteria requirements can be implemented based on device usage metrics/characteristics without departing from the spirit and scope of the present disclosure.

In embodiments, if two or more devices each satisfy enforced selection criteria, then one of the two or more devices can be selected. In these embodiments, a "tie-breaker" decision for selecting a device of multiple devices which satisfy selection criteria can be made based on a magnitude of factors (e.g., values) considered for selection. For example, if a first and second device both satisfy the criteria outlined in "Criteria 1," then a device can be selected based on which device has a higher user rank, a higher usage metric, and/or a closer proximity.

In some embodiments, a selection score can be calculated based on a plurality of weighted selection factors. In these embodiments, a device can be chosen for selection by the candidate device selector 230 if the selection score based on the plurality of weighted selection factors exceeds a selection criteria threshold. For example, the selection score can be calculated according to: Selection Score=$factor_1 \times weight_1 + factor_2 \times weight_2 \ldots + factor_n \times weight_n$.

Values for factors (e.g., $factor_1$–$factor_n$) can be assigned/determined in any suitable manner. For example, if proximity (e.g., distance, locality, etc.) is taken into consideration, a value of "1" can be assigned if the candidate device is nearby, and a value of "0" can be assigned if the candidate device is not nearby. As another example, if usage metrics are taken into consideration, a value between 0 and 1 can be assigned based on the magnitude of usage (e.g., high usage would result in a factor score closer to 1, where low usage would result in a factor score closer to 0). As another example, if user rank is taken into consideration as a factor for candidate device selection, a value between 0 and 1 can be assigned based on the magnitude of assigned user rank (e.g., a highest user rank can be 1 and a lowest user rank can be 0, with in between ranks somewhere in between 0 and 1).

Weights (e.g., $weight_1$-$weight_n$) assigned to factors can similarly be assigned/determined in any suitable manner. In embodiments, factors most likely to be important for selecting a candidate device for rerouting can be weighted higher, whereas factors least likely to be important for candidate device rerouting can be weighted lower. For example, following the example above, the proximity factor could have a weight of 0.80, the usage metrics factor could have a weight of 0.15, and the user rank factor could have a weight of 0.05. However, any suitable weights can be assigned to selection factors.

Following the example above, if a given candidate device is local (e.g., nearby the screen sharing device), usage metrics are moderate (e.g., a factor score of 0.60), and the user rank is low (e.g., a lowest rank yielding a 0 factor score for user rank), the selection score can be calculated as $(1 \times 0.80)+(0.6 \times 0.10)+(0 \times 0.05)=0.86$. In this example, if a threshold was defined as 0.85 such that any selection score exceeding 0.85 leads to a selection of the candidate device for contact rerouting, then the candidate device would be selected as the selection score of 0.86 exceeds the selection threshold of 0.85. Though reference is made to example calculations, any suitable values can be substituted for those shown without departing from the spirit and scope of the present disclosure.

The contact router 235 of the web conference contact routing system 205 then routes the contact from the original sender (e.g., the participant device of the web conference which transmitted the contact to the participant device of the web conference with active screen sharing) to the selected candidate device. In embodiments, routing by the contact router 235 can occur after (or during) transmission of the contact from the participant device to the participant device with active screen sharing but before receipt by the active screen sharing device. In these embodiments, the contact may not ever be received by the screen sharing device, as the contact can be dynamically rerouted prior to receipt by the screen sharing device.

In embodiments, routing by the contact router 235 can occur after receipt of the contact by the active screen sharing device. In these embodiments, the contact can be dynamically rerouted within a relatively fast time window (e.g., a time window required for processing by modules 215-235) such that the contact received by the receiving device is rerouted before any other participants of the web conference have an opportunity to read the contact.

Figure 3:
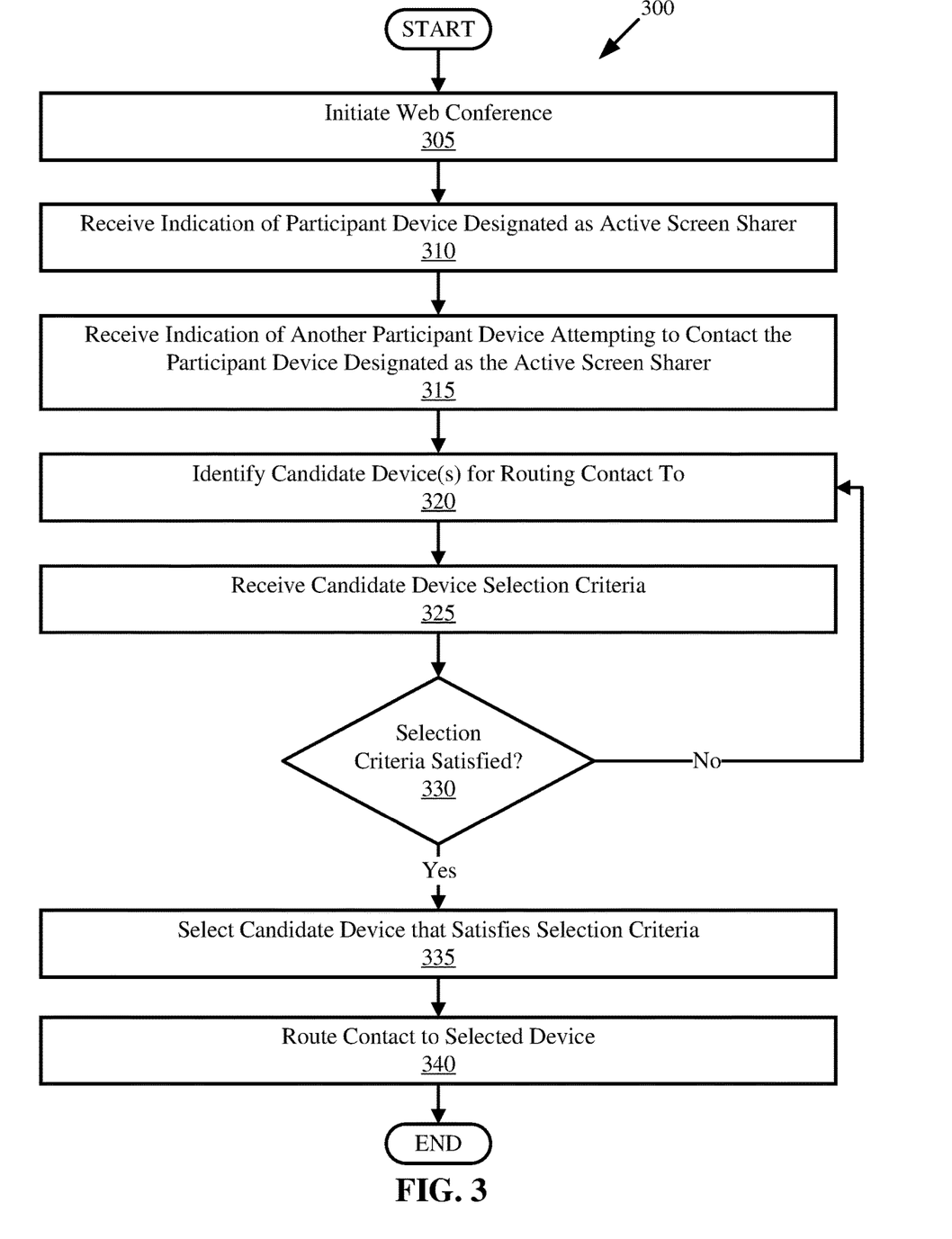
FIG. 3 is a flow-diagram illustrating an example method for web conference contact routing, in accordance with embodiments of the present disclosure.

Referring now to FIG. 3, shown is a flow-diagram illustrating an example method 300 for web conference contact routing, in accordance with embodiments of the present disclosure. One or more operations of method 300 can be completed by one or more computing devices (e.g., computer 101, user devices 255/270, candidate devices 280, web conference contact routing system 205).

Method 300 initiates at operation 305, where a web conference is initiated. The web conference can be hosted using web conference software 275 described with respect to FIG. 2. The web conference can allow transmission of text, audio, and/or video data in real-time between participants via their devices.

An indication of a participant device being designated as an active screen sharer is received. This is illustrated at operation 310. The indication of a screen sharing device being designated can be received based on an option or functionality associated with screen sharing being selected/executed. In embodiments, this can be determined via an API of the web conferencing software facilitating the web conference.

An indication of a participant device (e.g., a first participant device) attempting to contact the participant device designated as the screen sharer (e.g., a second participant device) is received. This is illustrated at operation 315. The indication can be received prior to or after receipt by the designated screen share device. For example, the indication can be received upon transmission from the sending device (e.g., the first participant device) or after receipt by the receiving screen sharing device (e.g., the second participant device).

Candidate device(s) for routing contact to (e.g., from the first participant device) are identified. This is illustrated at operation 320. Identifying candidate devices can be completed in the same, or a substantially similar manner, as described with respect to the candidate device identifier 220 of FIG. 2. For example, candidate devices can be discovered based on a pre-defined list (e.g., a participant profile), based on devices sharing a wireless network, based on IoT sensor data, etc.

Candidate device selection criteria are received. This is illustrated at operation 325. Candidate device selection criteria can be pre-defined. The candidate device selection criteria can be the same as, or substantially similar to, candidate device selection criteria described with respect to candidate device analyzer 225 of FIG. 2. The selection criteria can be based on candidate device usage metrics (e.g., recency and duration of use), contact methods (e.g., types of communication methods available to candidate devices, such as instant messaging applications, email clients, cellular networks, etc.), proximity (e.g., the distance between the screen sharing device and the candidate devices), contact method usage metrics, and/or user rankings. Table 2 highlights example selection criteria which can be enforced to select a candidate device for rerouting contact to.

A determination is made whether a candidate device identified at operation 320 satisfies the candidate device selection criteria of operation 325. This is illustrated at operation 330. For example, referring to Table 2, if selection criteria of "Criteria 1" of Table 2 are each met by a first candidate device, then the first candidate device can be selected for routing contact. In embodiments, if multiple candidate devices meet the selection criteria, then a first ranked candidate device (e.g., based on magnitude of selection criteria values) can be selected.

If a determination is made that a candidate device satisfies the selection criteria at operation 330 ("Yes" at operation 330), then the candidate device that satisfies the selection criteria can be selected for routing contact. This is illustrated at operation 335. If a determination is made that a candidate device does not satisfy the selection criteria, then method 300 can return to operations 320 and/or 325 where either additional candidate devices can be discovered and/or selection criteria can be updated. This can be completed such that a suitable candidate device can be identified which satisfies defined selection criteria.

Upon selecting the candidate device that satisfies the selection criteria, contact originally transmitted from the participant device to the participant device designated as an active screen sharer can be rerouted to the selected candidate device. This is illustrated at operation 340. Thus, the contact can be presented to the screen sharing user via the candidate device to prevent potential privacy complications resulting from active screen sharing on the web conference.

The aforementioned operations can be completed in any order and are not limited to those described. Additionally, some, all, or none of the aforementioned operations can be completed, while still remaining within the spirit and scope of the present disclosure.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system comprising:
one or more processors; and
one or more computer-readable storage media collectively storing program instructions which, when executed by the one or more processors, are configured to cause the one or more processors to perform a method comprising:
receiving an indication of a first participant device of a web conference attempting to contact a second participant device of the web conference, the second participant device designated as a screen sharer within the web conference during a time of the contact, the contact configured to be received on a display shared in the web conference;
identifying two or more candidate devices for routing the contact from the first participant device to;
selecting a candidate device of the two or more candidate devices for routing the contact from the first participant device to using a set of selection criteria; and
routing contact from the first participant device to the selected candidate device instead of the display of the second participant device shared in the web conference.

2. The system of claim 1, wherein the set of selection criteria specifies a usage metric criterion required to route contact to any candidate device.

3. The system of claim 1, wherein the set of selection criteria specifies a contact method criterion required to route contact to any candidate device.

4. The system of claim 1, wherein the set of selection criteria specifies a proximity criterion required to route contact to any candidate device.

5. The system of claim 1, wherein the set of selection criteria specifies a proximity criterion, a usage metric criterion, and a contact method criterion required to route contact to any candidate device.

6. The system of claim 1, wherein prior to identifying two or more candidate devices for routing the contact from the first participant device to, the method further comprises:

determining, via natural language processing, whether the content of the contact is intended to be private.

7. The system of claim 6, wherein if a determination is made that the content of the contact is not intended to be private, then the contact is not routed from the first participant device to the selected candidate device and is displayed on the display of the second participant device shared in the web conference.

8. A method comprising:
receiving an indication of a first participant device of a web conference attempting to contact a second participant device of the web conference, the second participant device designated as a screen sharer within the web conference during a time of the contact, the contact configured to be received on a display of the second participant device shared in the web conference;
identifying two or more candidate devices for routing the contact from the first participant device to;
selecting a candidate device of the two or more candidate devices for routing the contact from the first participant device to using a set of selection criteria; and
routing contact from the first participant device to the selected candidate device instead of the display of the second participant device shared in the web conference.

9. The method of claim 8, wherein the set of selection criteria specifies a usage metric criterion required to route contact to any candidate device.

10. The method of claim 8, wherein the set of selection criteria specifies a contact method criterion required to route contact to any candidate device.

11. The method of claim 8, wherein the set of selection criteria specifies a proximity criterion required to route contact to any candidate device.

12. The method of claim 8, wherein the set of selection criteria specifies a proximity criterion, a usage metric criterion, and a contact method criterion required to route contact to any candidate device.

13. The method of claim 8, wherein prior to identifying two or more candidate devices for routing the contact from the first participant device to, the method further comprises:
determining, via natural language processing, whether the content of the contact is intended to be private.

14. The method of claim 13, wherein if a determination is made that the content of the contact is not intended to be private, then the contact is not routed from the first participant device to the selected candidate device and is displayed on the display of the second participant device shared in the web conference.

15. A computer program product comprising one or more computer readable storage media, and program instructions collectively stored on the one or more computer readable storage media, the program instructions comprising instructions configured to cause one or more processors to perform a method comprising:
receiving an indication of a first participant device of a web conference attempting to contact a second participant device of the web conference, the second participant device designated as a screen sharer within the web conference during a time of the contact, the contact configured to be received on a display shared in the web conference;
identifying two or more candidate devices for routing the contact from the first participant device to;
selecting a candidate device of the two or more candidate devices for routing the contact from the first participant device to using a set of selection criteria; and
routing contact from the first participant device to the selected candidate device instead of the display of the second participant device shared in the web conference.

16. The computer program product of claim 15, wherein the set of selection criteria specifies a usage metric criterion required to route contact to any candidate device.

17. The computer program product of claim 15, wherein the set of selection criteria specifies a contact method criterion required to route contact to any candidate device.

18. The computer program product of claim 15, wherein the set of selection criteria specifies a proximity criterion required to route contact to any candidate device.

19. The computer program product of claim 15, wherein the set of selection criteria specifies a proximity criterion, a usage metric criterion, and a contact method criterion required to route contact to any candidate device.

20. The computer program product of claim 15, wherein prior to identifying two or more candidate devices for routing the contact from the first participant device to, the method further comprises:
Determining, via natural language processing, whether the content of the contact is intended to be private, wherein if a determination is made that the content of the contact is not intended to be private, then the contact is not routed from the first participant device to the selected candidate device and is displayed on the display of the second participant device shared in the web conference.

* * * * *